United States Patent [19]
Daspit et al.

[11] 3,754,101
[45] Aug. 21, 1973

[54] FREQUENCY RATE COMMUNICATION SYSTEM

[75] Inventors: John I. Daspit, West Los Angeles; Robert W. Jackman, San Diego; Charles L. Weber, Los Angeles, both of Calif.

[73] Assignee: Universal Signal Corporation, Cucamonga, Calif.

[22] Filed: July 2, 1971

[21] Appl. No.: 159,193

[52] U.S. Cl...... 179/15 FS, 179/15 BM, 179/15 BC, 325/50, 343/200, 343/201, 343/202
[51] Int. Cl............................................... H04j 1/06
[58] Field of Search.................... 179/15 BM, 15 FS, 179/15 BC; 343/200, 201, 202, 207, 208; 340/171; 325/30, 50

[56] References Cited

UNITED STATES PATENTS

| | | | |
|---|---|---|---|
| 2,878,318 | 3/1959 | Leek | 179/15 BM |
| 3,201,757 | 8/1965 | Himmel | 340/171 |
| 2,960,573 | 11/1960 | Hodgson | 179/15 FS |
| 2,954,465 | 9/1960 | White | 179/15 BM |
| 1,910,977 | 5/1933 | Weis | 179/15 FS |

*Primary Examiner*—Albert J. Mayer
*Attorney*—Harris, Kern, Wallen & Tinsley

[57] ABSTRACT

A communication system for transmitting a plurality of analog or digital information signals to a receiver with an improvement in band width utilization over conventional systems. A system with a plurality of swept frequency encoding signals, each frequency modulated at the same rate but with different phase, and in the preferred embodiment, means for amplitude modulating each encoding signal with a double sideband, suppressed carrier signal which may comprise two information signals, with the modulator outputs summed to provide a combined signal for further processing incorporating additional information signals and/or for transmission to a receiver. A system utilizing three such modulation arrangements for eighteen information signals and three combined signals, with the three combined signals used for amplitude modulating another set of three swept frequency encoding signals to provide a further combined signal for transmission to a receiver. A receiver with a decoding system providing the reverse of the encoding system. A receiver wherein one or more of the transmitted information signals can be selected for reproduction.

29 Claims, 16 Drawing Figures

GENERATION OF THE ENCODING SIGNALS (BASIC SWEPT FREQUENCY)

FREQUENCY-RATE ENCODING GRAPH OF FREQUENCY vs. TIME

FREQUENCY-RATE ENCODING BASIC SWEPT-FREQUENCY PROCESS.

FREQUENCY-RATE ENCODING THREE-LINE METHOD TWO-LEVEL ENCODING

INVENTORS
JOHN I. DASPIT,
ROBERT W. JACKMAN &
CHARLES L. WEBER
BY THEIR ATTORNEYS
HARRIS, KIECH, RUSSELL & KERN

FIG. 2B. FREQUENCY RATE ENCODING (WITHOUT SUB-CARRIER)

FREQUENCY RATE ENCODING (WITHOUT SUB-CARRIER)

GENERATION OF THE ENCODING SIGNALS (BASIC SWEPT FREQUENCY)

INVENTORS
JOHN I. DASPIT,
ROBERT W. JACKMAN &
CHARLES L. WEBER
BY THEIR ATTORNEYS
HARRIS, KIECH, RUSSELL & KERN

TWO LEVEL FREQUENCY RATE ENCODING BASIC BLOCK DIAG.

GENERATION OF THE ENCODING REFERENCE SIGNAL (THREE LINE METHOD)

INVENTORS
JOHN I. DASPIT,
ROBERT W. JACKMAN &
CHARLES L. WEBER
BY THEIR ATTORNEYS
HARRIS, KIECH, RUSSELL & KERN

FREQUENCY-RATE COMMUNICATIONS MULTIPLEXING SYSTEM
OVERALL SIMPLIFIED SYSTEM BLOCK DIAGRAM

INVENTORS
JOHN I. DASPIT,
ROBERT W. JACKMAN &
CHARLES L. WEBER
BY THEIR ATTORNEYS
HARRIS, KIECH, RUSSELL & KERN

INVENTORS
JOHN I. DASPIT,
ROBERT W. JACKMAN &
CHARLES L. WEBER
BY THEIR ATTORNEYS
HARRIS, KIECH, RUSSELL & KERN

INVENTORS
JOHN I. DASPIT,
ROBERT W. JACKMAN &
CHARLES L. WEBER
BY THEIR ATTORNEYS
HARRIS, KIECH, RUSSELL & KERN

INVENTORS
JOHN I. DASPIT,
ROBERT W. JACKMAN &
CHARLES L. WEBER
BY THEIR ATTORNEYS
HARRIS, KIECH, RUSSELL & KERN

INVENTORS
JOHN I. DASPIT,
ROBERT W. JACKMAN &
CHARLES L. WEBER
BY THEIR ATTORNEYS
HARRIS, KIECH, RUSSELL & KERN

NATURAL FM TRANSMITTER

NATURAL FM ENCODING SIGNAL GENERATOR $m_i = \sqrt{2}\,\sin[\omega_c t + \phi_0 + B\sin(\omega_m t + \phi_i)],\ i = 1, 2 \text{---} K$ INVENTORS
JOHN I. DASPIT,
ROBERT W. JACKMAN &
CHARLES L. WEBER
BY THEIR ATTORNEYS
HARRIS, KIECH, RUSSELL & KERN

NATURAL FM RECEIVER-DECODER

INVENTORS
JOHN I. DASPIT,
ROBERT W. JACKMAN &
CHARLES L. WEBER
BY THEIR ATTORNEYS
HARRIS, KIECH, RUSSELL & KERN

FREQUENCY RATE COMMUNICATION SYSTEM

BACKGROUND OF THE INVENTION

This invention relates to a new and improved communication system for digital or analog information and in particular, to a system with improved band width utilization and improved discrimination against unwanted signals and noise. Signal handling systems utilizing first and higher time derivatives of frequency have been described, including those in the copending application Noise Reduction System, Ser. No. 886,005, filed Dec. 17, 1969 (a continuation-in-part of Ser. No. 609,890, filed Jan. 17, 1967, now abandoned) and the copending application Signal Processing System for Discriminating Between a Desired Signal and Other Signals, Ser. No. 129,052, filed Mar. 29, 1971 (a continuation-in-part of Ser. No. 786,915 filed Dec. 26, 1968, now abandoned) and the prior art cited in the prosecution of said applications.

SUMMARY OF THE INVENTION

The present invention is a communication system which will handle a plurality of input information signals, transmit them to one or more receivers, and provide for production of one or more selected signals from the plurality of input information signals. The communication system provides for transmission of a plurality of the input information signals in the same spectrum, resulting in an improved band width utilization. The communication system provides for transmission of a plurality of the input information signals from one transmitter to one or more receivers and at the same time having the capability of limiting a receiver to receive and decode only a selected one or more of the input information signals, thereby providing privacy and security for individual input information signals while transmitting a plurality of such signals simultaneously.

A plurality of encoding signals of specific chalacteristics are generated at the transmitter. Each input information signal or, in one embodiment, each pair of input information signals, is amplitude modulated by an encoding signal, providing a plurality of encoded signals. The plurality of encoded signals are combined for transmission to the receiver where the reverse process is carried out. In one form of the invention, the encoding process at the transmitter can be repeated one or more times, using the encoded signals as the information signals and using a second set of encoding signals in the modulation. Decoding signals, corresponding to the encoding signals, are generated at the receiver, and any desired information signal from the transmitter can be selected at the receiver by utilizing only selected decoding signals.

The encoding signals are swept frequency or frequency-rate or frequency-modulated signals. More specifically, the encoding signals have equal frequency and equal phase carriers and vary in frequency with time at the same frequency modulation, with the frequency modulations of a group of the encoding signals differing in phase from each other with substantially equal phase differences.

Several embodiments of the frequency-rate communication system are described with various numbers of encoding signals and different forms of encoding signals and several levels of processing. The particular form selected for any specific system will depend upon which of the parameters it is desired to optimize, these parameters including band width utilization, noise, the maximum number of input information signals, and cost.

BRIEF DESCRIPTION OF THE DRAWINGS

FIGS. 2A and 2B are spectra for basic swept-frequency process with and without a sub-carrier, respectively;

GLOSSARY OF SYMBOLS

Figure 1:
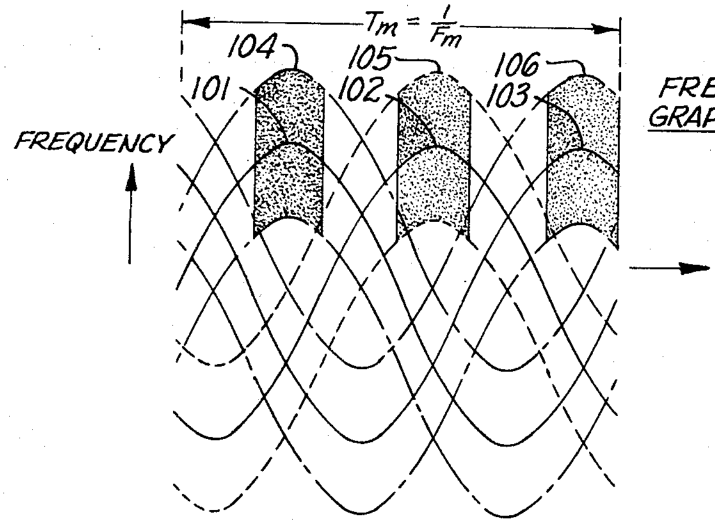
FIG. 1 is a graph of frequency vs. time.

AM amplitude modulation $F_m$ frequency modulation rate or encoding frequency

AM-DSB-SC amplitude modulated-double sideband-suppressed carrier $F_{sc}$ subcarier frequency about which quadrature phase-multiplex signals are centered FM frequency modulation W spectral bandwidth of analog or digital baseband information signal $\phi_m$ phase of $F_m$ $\beta$ index of frequency modulation ($\beta = F/F_m$)

PM phase modulation

BUF bandwidth utilization factor

A1, A2 - - - signal inputs to first-level frequency-rate encoder $m_1$, $m_2$, $m_3$ encoding reference signals for first-level encoding X doubly balanced modulator with low-pass or band-pass filter

B1, B2, B3 signal inputs to second-level frequeny-rate encoder $S_i$ baseband analog or digital information signal inputs, $i = 1, 2, \ldots K$ $r_1$, $r_2$, $r_3$ encoding reference singals for second-level encoding C1 output of second-level encoder F1 center frequency (vestigial phase reference) of composite signal after first-level encoding F2 center frequency (vestigial phase reference) of composite signal after second-level encoding $F_1$ $\lfloor 0°$ zero degree phase reference of signal at frequency $F_1$ $\hat{S}_i$ decoder estimates of original analog or digital information signals kHz kilo-Hertz A quadrature phase -multiplex sinusoidal modulation reference B quadrature phase-multiplex cosinusoidal modulation reference $F_{r1}$ center frequency of encoding triplet for first-level encoding $F_{r2}$ center frequency of encoding triplet for second-level encoding $F_o$ center frequency of swept FM encoding spectrum K number of signals being encoded R vestigial carriers $f_c$ carrier frequency (Hertz)

$\phi_o$ phase reference of master oscillator at $f_c$ $\omega_c$ $2\pi f_c$ $\omega_m$ fundamental encoding frequency (rad/sec)

$e_i$ encoded signals $F_t$ coherent reference signal needed for demodulation $\hat{\phi}_m$ receiver tracking loop's estimate of the encoding reference phase, $\phi_m$ $\hat{\phi}_o$ receiver tracking loop's estimate of the carrier reference phase $\phi_o$ $Fj(s)$ tracking loop filter; $j = 1, 2$ $\tilde{\phi}_m$ inner loop tracking error $\tilde{\phi}_o$ outer loop tracking error $J_o$ Bessel function

GENERAL DESCRIPTION OF THE FREQUENCY RATE COMMUNICATION SYSTEM

The system of the invention can be explained simply in the following manner: Signals which contain a varying frequency as a natural or tailored characteristic can, in many instances, be selectively enhanced using this varying frequency signature as the basis for discrimination (selection) from other signals and/or noise simultaneously occupying the same spectra space. Variations of a function with time can be described by specifying the first and higher order temporal derivatives of that function. Equivalent to discriminating on the basis of a temporal frequency derivative, is the similar use of the second temporal derivative of phase. Second and third and higher order frequency derivatives correspond to third and fourth and higher order phase derivatives.

FIG. 1 illustrates three sinusiodally varying encoding signals 101, 102, 103 of the same average frequency, of the same frequency amplitude and having the same frequency of modulation. Yet the frequency-rate and the higher derivatives of frequency are unique and different for each $f$ vs. $t$ encoding signal relative to each of the other signals. Superposed on each encoding or frequency-rate carrier 101, 102, 103 and varying in frequency with the encoding function as the center frequency, are separate information signals in the form of AM sidebands 104, 105, 106. The intelligence sideband limits are shown close to their related swept frequency encoding carriers for convenience in illustration and visualization of this process. $F_m$ is the encoding frequency which the carrier is swept up and down along the frequency axis. The nature of the frequency-rate encoding process described herein is such that the AM information sidebands can extend out to a maximum value equal to $F_m$ above or below the related encoding spectral lines.

The basic concepts of frequency-rate encoding are difficult to visualize, to analyze and to describe with the aid solely of frequency vs. time diagrams. The spectral diagrams of FIGS. 2 and 3 will be of assistance in visualizing the method of operation of this novel multiple-signal encoding, transmission and decoding system.

Figure 2A:
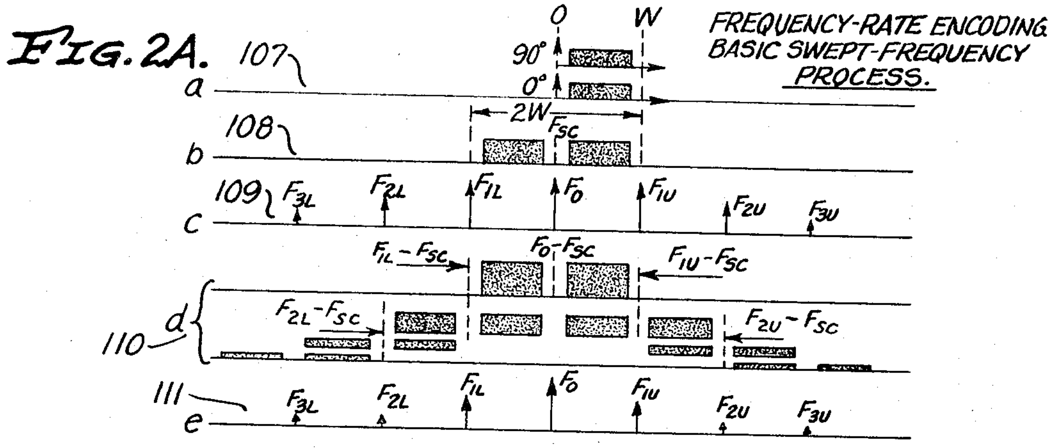

In the spectral diagrams of FIG. 2A, 107 represents a pair of analog or digital signals at baseband, of equal bandwidth W, which are to be encoded using the frequency-rate encoding system. Each pair of information signals to be encoded is converted from single sided spectra at baseband to quadrature-superposed double-sided spectra centered about a suppressed subcarrier. This step in the process of signal preparation for encoding yields the well known and conventional quadrature phase-multiplex AM-DSB-SC (amplitude modulation, double sideband, suppressed carrier) type of spectrum shown in 108 of FIG. 2A. Any pair of information signals to be encoded is converted first from baseband into the form of signal shown by the spectrum 108.

Encoding proper, according to the method of this invention, consists of amplitude modulating the encoding signal, as in 109 of FIG. 2A, by two information signals in (conventional) quadrature phase-multiplex (AM-DSB-SC) as shown in 108. The result is a spectrum as shown in 110 where each spectral line of the narrow band FM spectrum of the form 109 has determined the center-line of a pair of amplitude modulation sidebands. In the preferred embodiment, the "sum" frequency modulation products are discarded leaving only the "difference" frequency products as useful encoder outputs, although the sum products could be used and the difference products discarded if desired. Balanced modulation is used so that the resulting encoded information signal appears as a group of AM-DSB-SC signals with as many such sideband pairs as there are lines in the encoding frequency-rate spectrum. The center frequency is the difference between the central encoding line and the value of $F_{sc}$, the suppressed subcarrier frequency of 108.

The encoding signal of the frequency-rate encoder, although of a swept frequency nature with a specific and unique frequency vs. time function in the first and higher order derivatives of frequency vs. time, is most conveniently visualized and represented by its equivalent spectrum as shown in 109. This is the spectrum of a sinusoidally frequency-modulated (FM) signal. For this encoding signal, the modulating frequency, $F_m$ has been made equal to the bandwidth of the analog or digital baseband information signals which are to be encoded.

The modulating frequency $F_m$ should be equal to or greater than the analog or digital signal baseband spectral bandwidth, W. The selection of $F_m = W$ provides optimum bandwidth utilization and the encoding process performs the useful and valuable function of enabling many analog or digital signals to be superposed in spectral space, providing highly efficient bandwidth utilization during transmission and/or dynamic storage and still enabling complete separation of one signal from the other at the receiver-decoder of the frequency-rate communication system.

Another feature of the FM encoding signal as shown in 109 is the value of the FM index $\beta$. For optimum performance, this index of FM is set at 1.388. This is the optimum value for non-interfering separation of a wanted encoded signal from the totality of encoded signals occupying the same spectral space.

Yet another feature of the frequency-rate encoding signal, whose spectrum is shown in 109, is the phase $\phi_m$ of the frequency modulating signal, $F_m$. The phase of this encoding signal parameter should be a particular value relative to the phase of the frequency modulating signal parameter of other encoded signals for complete separation to be obtained after spectral superposition. Three such encoded signals can be spectrally superposed for efficient bandwidth utilization during transmission. Complete separation by proper decoding can be accomplished if the relative phases of the frequency modulating signals, which determine the frequency-rate characteristics of the encoding signals, are set 120° apart. For example, one acceptable set of $F_m$ phases are: $\phi_{m1} = 0°$, $\phi_{m2} = 120°$, $\phi_{m3} = 240°$. Thus if encoding signal No. 1 had the phase of $F_m$ ($\phi_{m1}$) set equal to 0°, the encoding signal No. 2 should have $\phi_{m2}$ set to 120° and encoding signal No. 3 should have $\phi_{m3}$ set to 240°.

Any set of phases of the $F_m$ parameters for the three encoding signals, $\phi_{m1}$, $\phi_{m2}$, $\phi_{m3}$ which distribute $\phi_{m1}$ $\phi_{m2}$, and $\phi_{m3}$ uniformly about the 360° of possible phases will perform equally well. Thus (e.g.) 10°, 130° and 250° would constitute proper phases according to this invention as would (e.g.) 30°, 150° and 270°. In general, the phase of the encoding parameter, $F_m$, for signal No. 1, $\phi_{m1}$, must be equidistant in phase from each of the other two similar encoding parameters, $\phi_{m2}$ and $\phi_{m3}$ (for signals No. 2 and No. 3) in order to permit optimum, complete, noninterfering information signal separation to be obtained at the receiver-decoder.

In summary of the immediately foregoing detailed explanation of this frequency-rate encoding technique, the following salient features for optimum performance are noted:

The encoding signal is formed by using conventional FM with particular values for $F_m$, the phase of $F_m$, $\phi_m$, and the FM index, $\beta$. The preferred values are: $F_m = W$, the information bandwidth; $\phi_m$: $(\phi_{m3}-\phi_{m2})=(\phi\lambda_{m2}-\phi_{m1})=(\phi_{m1}-\phi_{m3})$ in the specific embodiment described herein $\phi_{m1}=0°$, $\phi_{m2}=120°$, $\phi_{m3}=240°$; and FM index, $\beta$, equal to 1.388.

Each of the three encoding signals, having these frequency-rate characteristics and representable by a conventional FM spectrum, is amplitude modulated by a pair of information signals in the form of spectrum 108 of FIG. 2A. The result is an encoded signal spectrum 110, where the several sideband groups, each centered about a frequency translated FM spectrum line, have been shown separated to avoid confusion in illustration. In practice, these would appear linearly superposed and thus form one frequency-rate encoded signal. These are second-level encoded signals.

Three such encoded signals, occupying exactly the same spectral space are linearly summed, amplified conventionally by a linear amplifier and transmitted in the form of conventional AM, PM or FM or other modulation. At the receiver, the code key is generated. The generation of the code key is based on prior knowledge at the receiver of the frequency-rate encoding signal parameters. This permits selection of the wanted one of the three spectrally superposed encoded signals to the exclusion of the other two.

In 111 of FIG. 2A, the relative power spectrum of the swept frequency or frequency-rate encoding signal is shown. It can be seen that only the central three lines have appreciable power levels. This is the result of the choice of FM index $\beta$, at or near 1.4 (ideally 1.388) for separability of any one encoded signal from the other two.

It has been found that only the central three lines of this narrow band FM spectrum are needed to provide all the most valuable features of this invention. In addition to the novel and valuable features detailed above, the use of only three encoding signal spectral lines as shown in the spectrum 114 of FIG. 3A, results in the entire encoded signal being contained with a spectral space only 4W wide, where W is the common baseband width of any individual information signal. Desirably, these lines have equal amplitudes for optimum performance.

Figure 3A:
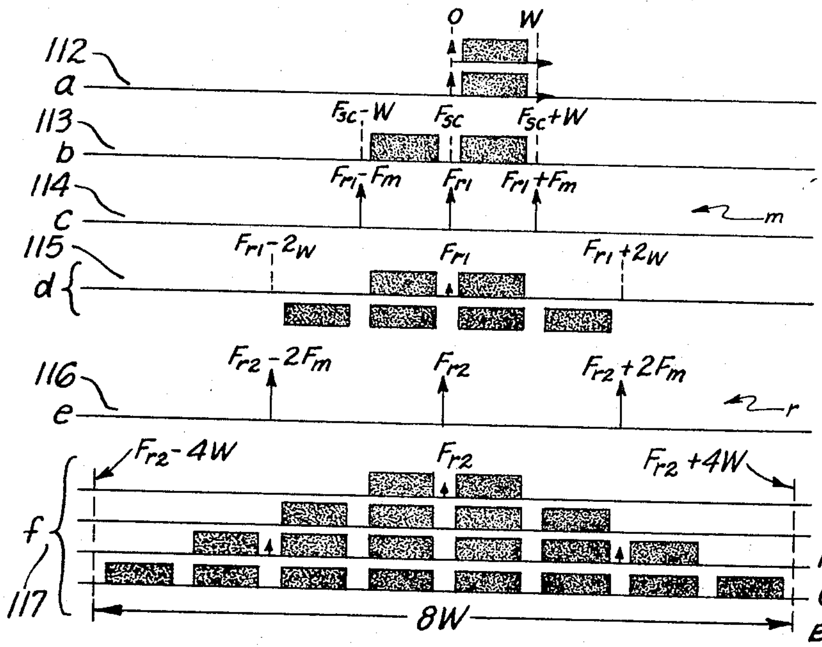
FIGS. 3A and 3B are spectra for three-line method of two-level encoding with and without a sub-carrier, respectively.

Three pairs of such information signals, each pair being in the spectral form of quadrature phase-multiplex, AM-DSB-SC (i.e., about a suppressed sub-carrier $F_{sc}$) as shown in 113 of FIG. 3A, can be combined into the form of a simultaneous multiplex, frequency-rate encoded signal as described above. Each pair of information signals can be separated completely from the remaining two encoded pairs by the novel decoding system described herein. Conventional quadrature phase separation technique is used to separate each individual signal of a pair from its quadrature associated signal.

Thus at the first encoding level, a total of six completely separable (non-interfering) signals can be encoded and superposed in the same spectral space, transmitted with a high bandwidth utilization factor and then selectively decoded and recovered. The transmission bandwidth is 4W so that the ratio of the sum of the baseband information signal spectral widths (6W) to the frequency-rate encoded multiplex transmitted signal bandwidth (4W) is 1.5 for first-level encoding. This ratio, called the bandwidth utilization factor (BUF) is quantitatively descriptive of this valuable feature of the novel frequency-rate encoding system.

Figure 4:
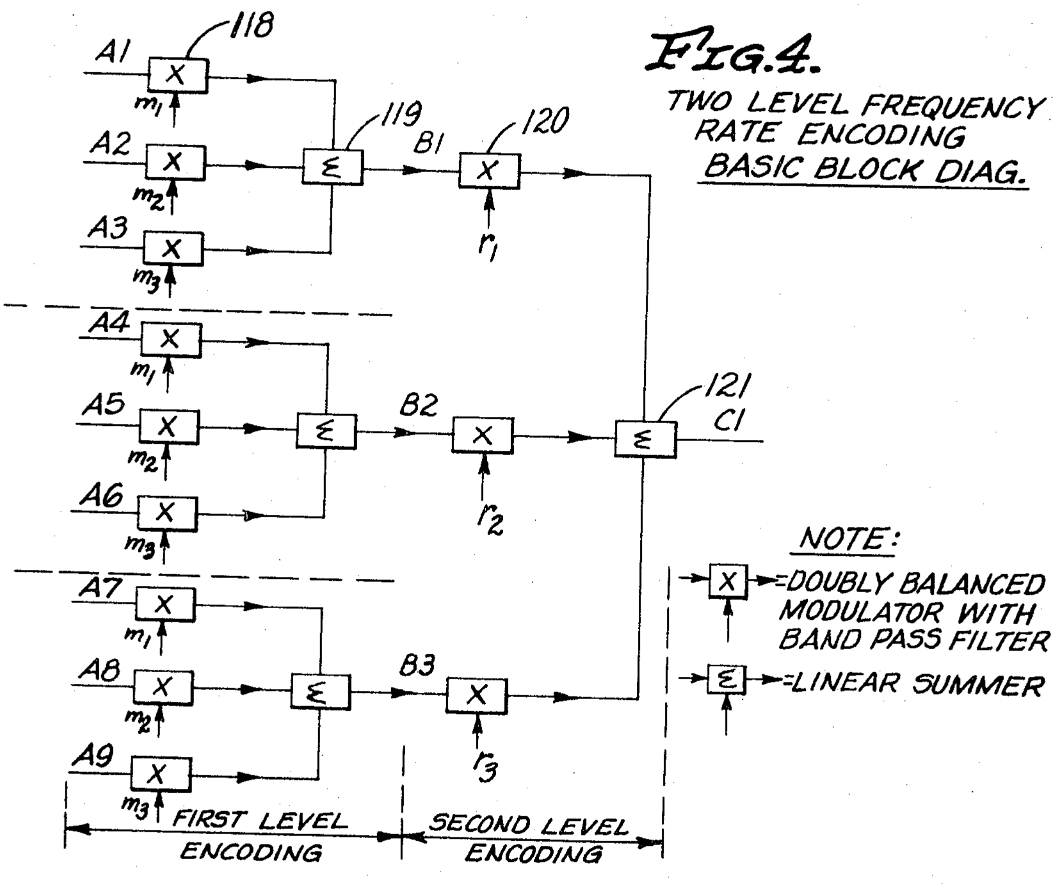
FIG. 4 is a block digaram of a system illustrating two-level encoding.

Basic first and second level frequency-rate encoding is shown in the block diagram FIG. 4. A1, A2 — — — A9 are signals of the type shown in FIG. 3A, spectrum 113. Each contains the information of two independent baseband signals, of W bandwidth each, in a spectral space of 2W. To obtain spectra such as 113 of FIG. 3A from spectra such as 112, conventional AM-DSB-SC is used with quadrature phase-multiplexing. Thus signals A1 through A9 contain information from 18 independent baseband signals.

$m_1$, $m_2$, and $m_3$ are first-level encoding signals of the type shown in the spectrum 114 of FIG. 3A. The only difference between these encoding signals is in the phase of the $F_m$ parameters, $\phi_{m1}$ for $m1$, $\phi_{m2}$ for $m2$, and $\phi_{m3}$ for $m3$. The phases must be selected so that: $(\phi_{m3} - \phi_{m2})=(\phi_{m2} - \phi_{m1})=(\phi_{m1} - \phi_{m3})$. Equivalently, $\phi_{m1}$, $\phi_{m2}$ and $\phi_{m3}$ must be distributed uniformly and mutually equidistant about the phasor circle, i.e., over 360°. One acceptable set of $F_m$ phases for encoding is: $\phi_{m1} = 0°$; $\phi_{m2} = 120°$; $\phi_{m3} = 240°$.

The blocks marked X, 118 and 120 in FIG. 4, are doubly balanced modulators. The sum frequency is assumed filtered out in each case, so that a bandpass filter or a low pass filter is assumed to be part of each block X.

Signals such as B1, B2, B3 in FIG. 4 (and in FIG. 6) are encoded signals from the first encoding level. Each of these three encoded signals contains information from six independent baseband signals, S1 — — — S6, S7 — — — S12, S13 — — — S18. The form of each of the signals B1, B2, B3 is that shown in the spectrum 115 of FIG. 3A. Each of the first level encoded outputs exhibits a bandwidth utilization factor (BUF) of 1.5, since six baseband signals of bandwidth W each are compressed into the common encoded spectral space of 4W.

The signal B1 can be used for transmission of six information signals S. The encoding system can be repeated to triple the number of information signals handled at a second encoding level. There is no theoretical limit on the number of encoding levels, but practical considerations presently indicate that first and second encoding levels be utilized.

In the second level of encoding, B1, B2 and B3, each having bandwidth 4W, are each encoded, (amplitude modulated) by second-level encoding triplet signals, $r_1$, $r_2$ and $r_3$ in modulators 120 of FIG. 4. These encoding triplets have a common center frequency which is different from that used for the first-level encoding triplet. Furthermore, the separation of the outer lines of the triplet from the center line is $2F_m$ where $F_m = W$. This separation is double that used for the first level encoding triplet. These second level encoding triplet signals, $r_1$, $r_2$, and $r_3$ each have a spectrum as shown in 116 of FIG. 3A.

The second-level encoded sum signal, C1, at the output of summer 121 of FIG. 4, has a spectrum of the form given by 117. The width of this second level encoded spectrum is 8W. Each of the three second-level spectra which are summed to form C1 occupies the same spectral space. Hence, when added, the width of C1 is no greater than that of any one of the three separate second-level signals which form the inputs to the second level summation function block. Since each component of C1 contains six information signals of baseband width W each, C1 contains information from eighteen baseband signals of width W each, in a second-level encoded spectral space of 8W. This yields of BUF of 2.25 for the second-level signals encoded by the frequency-rate technique.

Figure 5B:
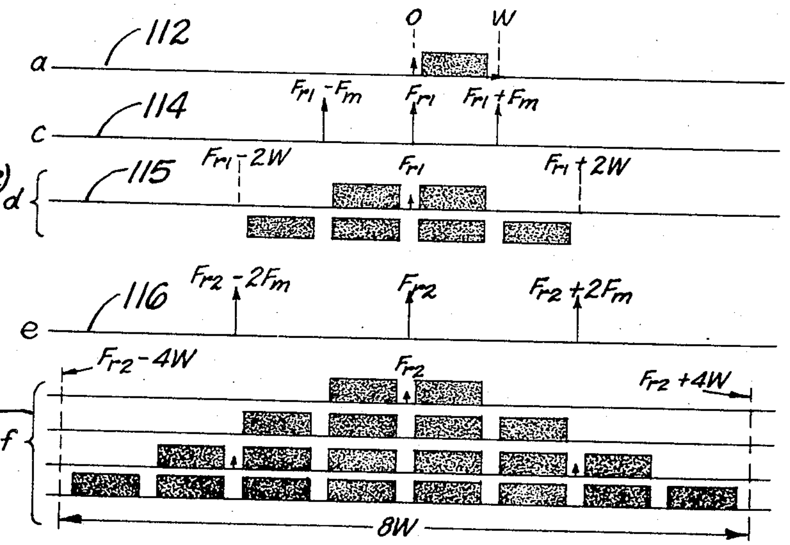
FIG. 5B is a block diagram similar to that of FIG. 5A, for the spectra of FIGS. 2A and 2B.
Figure 5B:
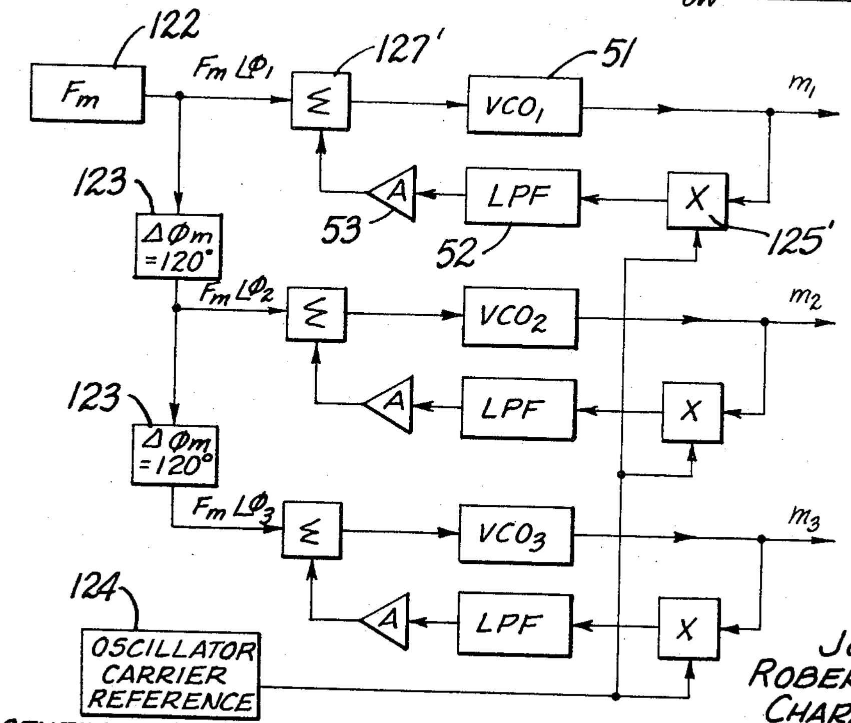

A preferred circuit for generating the encoding triplet signal 114 or 116 of FIG. 3A, for first-level or second-level encoding, respectively, is shown in FIG. 5. For purposes of illustration, the first-level encoding case will be described. For this case, $F_m = W$. For second-level encoding, $F_m = 2W$. A sinusoidal oscillator 122 generates the code key parameter $F_m$ at $\phi_{m1}$. The value of $F_m$ is made equal to the information bandwidth limit. As one numerical example, $F_m$ could be set at 3.6 kHz for an information signal, e.g., speech which had spectral components extending from 300 Hz to 3000 Hz.

Phase shifters 123 for $\phi_1$ and $\phi_2$ shift the phase of $F_m$ by 120° each. Thus $\phi_{m2} = \phi_{m1} + 120°$ and $\phi_{m3} = \phi_{m2} + 120°$. This satisfies the encoding triplet phase requirements stated in the foregoing basic explanation. Another sinusoidal oscillator 124 of frequency $F_1$ or $F_2$ (reference to the encoding triplet spectra shown in 114 and 116 of FIG. 3A) is used as one common input to three doubly balanced amplitude modulators, X1, X2, X3, 125. The other inputs are $F_m$, $\phi_{m1}$ to X1; $F_m$, $\phi_{m2}$ to X2; $F_m$, $\phi_{m3}$ to X3.

The signals at the outputs of the doubly balanced modulators 125, X1, X2, and X3, are pairs of amplitude modulation sidebands with suppressed carrier. The separation of each pair of lines is $2F_m$. The spacing of each line from the suppressed carrier, $F_1$, is $F_m$. Phase shifter $\phi_3$ 126 produces exactly 90° phase shift in $F_1$ (or $F_2$). This phase shifted spectral line at $F_1$ is added to each of the code key sideband pairs in the summation function blocks 127. The result is a group of three encoding lines. The center frequencies of these triplets are identical as are the frequencies of the upper and lower amplitude modulation sidebands derived from $F_1 \angle 0°$. The sidebands carry the code key which differs from $m_1$ to $m_2$ to $m_3$.

To generate a second-level encoding triplet spectral group, $F_m$ is made equal to 2W instead of W. More generally, $F_m$ preferably is made equal to half the two-sided bandwidth of the information spectrum to be directly encoded. Thus first-level encoding (e.g.) of a signal with a spectrum as shown in 113 of FIG. 3A which is 2W wide, requires that $F_m = W$. Second-level encoding (e.g.) of a signal with a spectrum as shown in 115 of FIG. 3A, which is 4W wide, requires that $F_m = 2W$.

At the receiver, recovery of the original signals which were frequency-rate encoded, is accomplished by coherently phase-tracking the vestigial carrier reference signals (e.g., $F_1$ or $F_2$) and thereby extracting required phase reference information. Using this, along with prior code key knowledge at the receiver, the original encoding reference signals can be reconstructed. If these can be reconstructed perfectly (i.e., no phase jitter or noise) then perfect signal recovery (i.e., complete signal separation) can be attained. The code key (demodulation reference) signals are used to coherently modulate the incoming signal group (demodulation or detection). One of the modulation products, the difference frequency, is the wanted signal. This is illustrated in general block diagram form in FIG. 6 and in detail in FIGS. 9 and 10, and is described in detail below.

Figure 8:
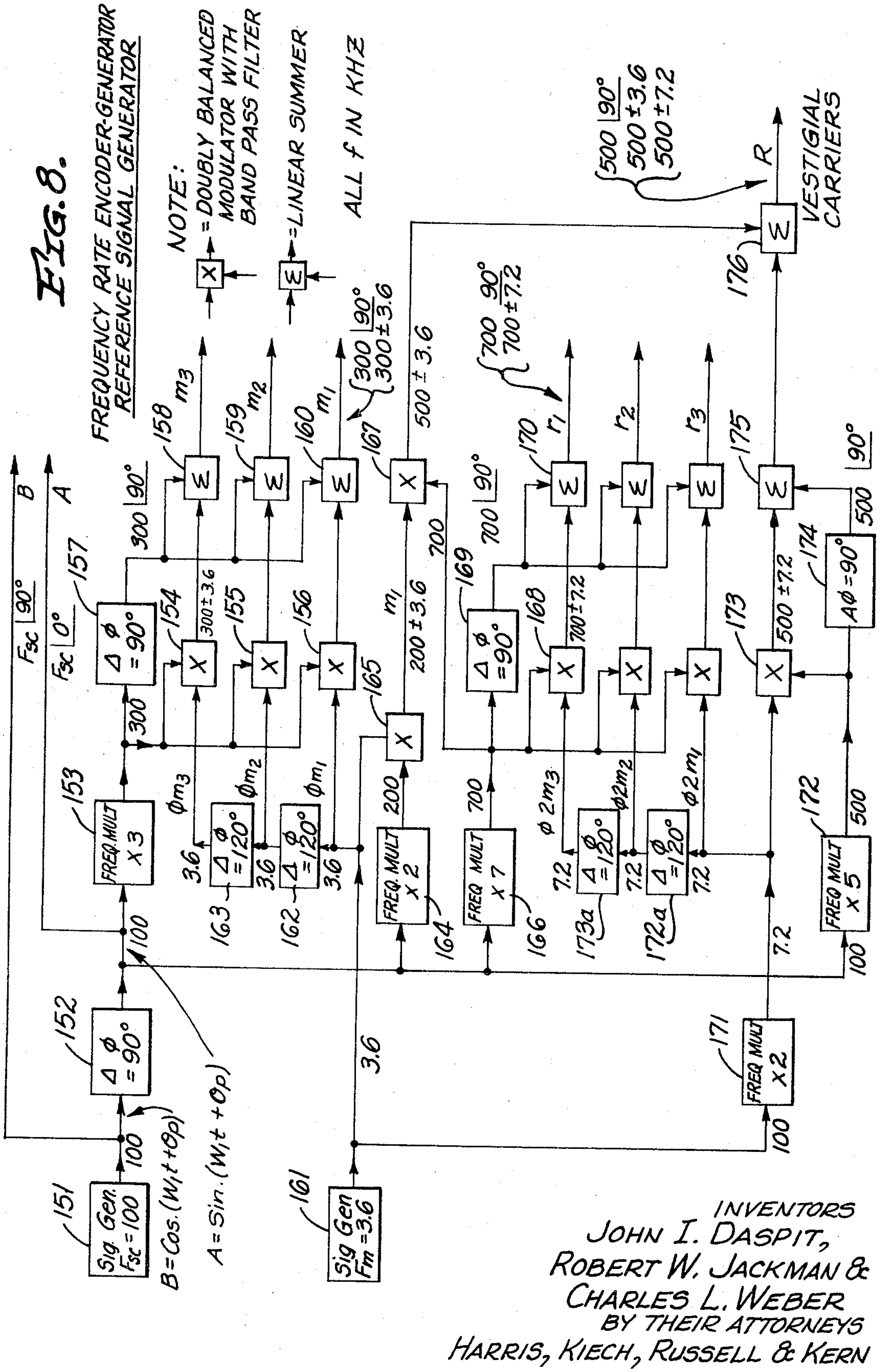
FIG. 8 is a block diagram of an encoder-transmitter (reference signal generator) for the system of FIG. 6.

Vestigial carries, which serve as phase references, are generated along with the encoded and bandwidth-compressed information signals (FIG. 8). In the description of the receiver-decoder coherent tracking loop and code key generator, it will be seen how these phase reference signals (vestigial carriers) are employed in the decoding process. In the embodiment described, the transmission of phase reference is necessary to the receovery of the information at the receiver. The code key, already known to the receiver, is utilized in addition to the phase reference.

Figure 5A:
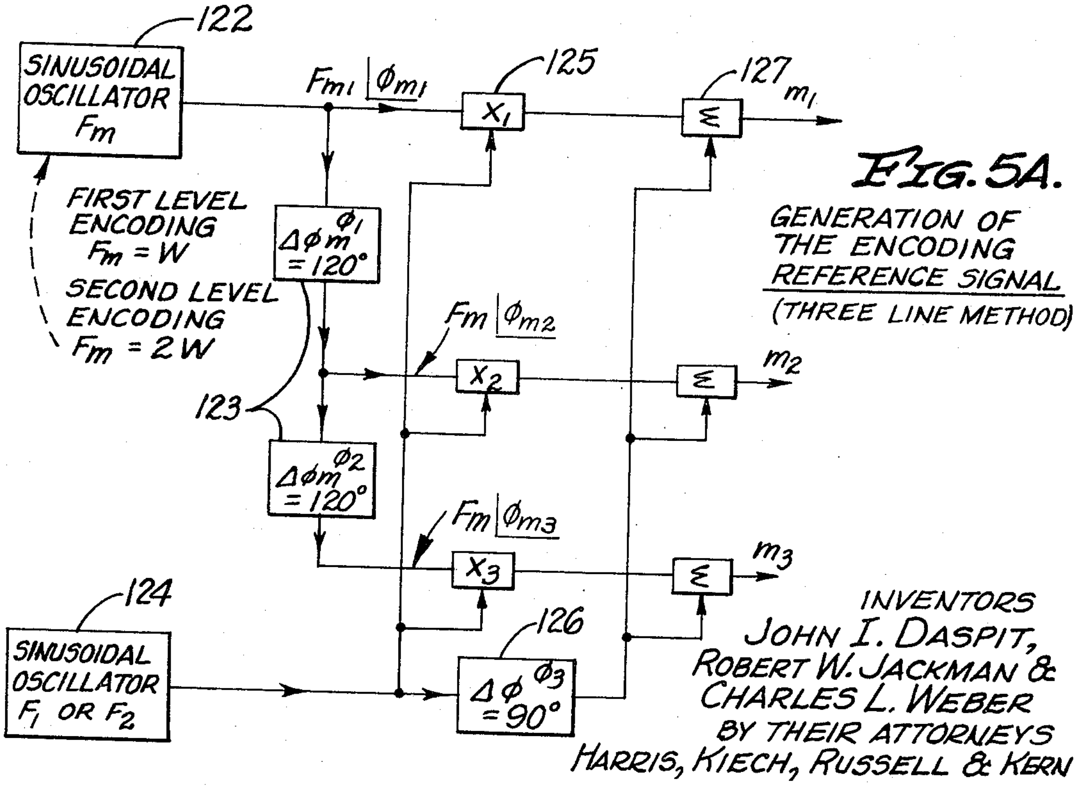
FIG. 5A a block diagram of apparatus for generation of encoding reference signals for the spectra of FIGS. 3A and 3B.

A preferred circuit for generating the encoding signal 109 of FIG. 2A is shown in FIG. 5B, where components corresponding to those of FIG. 5A are identified by the same reference numerals. The output $F_m$ at $\phi_1$ of the oscillator 122 is combined with the output of modulator 125' at summer 127' to provide an input to a voltage controlled oscillator 51. The voltage controlled oscillator 51 and the oscillator 124 provide the inputs to the modulator 125', with the modulated output connected to the summer 127' through a low pass filter 52 (typical band width less than 1 Hz) and an amplifier 53. Similar circuits are provided for $F_m$ at $\phi_2$ and $F_m$ at $\phi_3$.

Figure 3B:
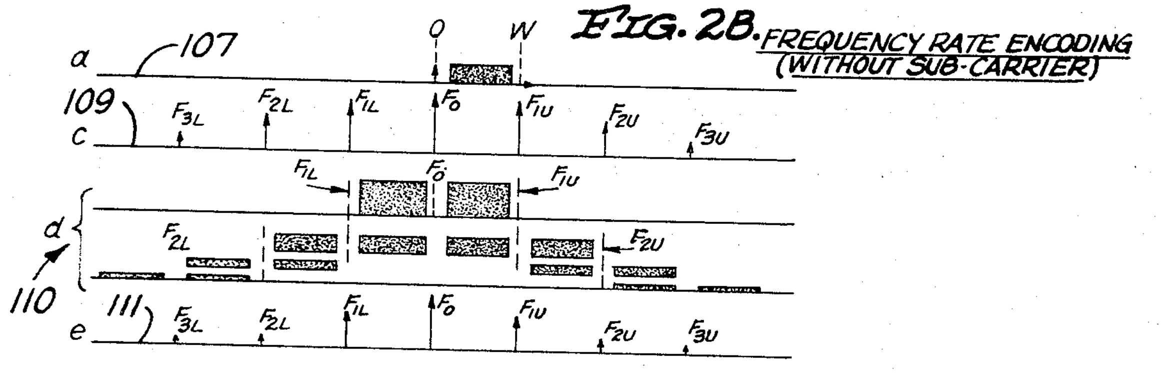

While the use of a pair of AM-DSB-SC information signals in phase quadrature, as shown in the spectral diagrams of FIGS. 2A and 3A, is preferred, direct modulation of the encoding signal by a single baseband information signal may be used. The spectral diagrams of FIGS. 2B and 3B illustrate this variation of the diagrams of FIGS. 2A and 3A, respectively.

DESCRIPTION OF THE PREFERRED EMBODIMENT

Figure 6:
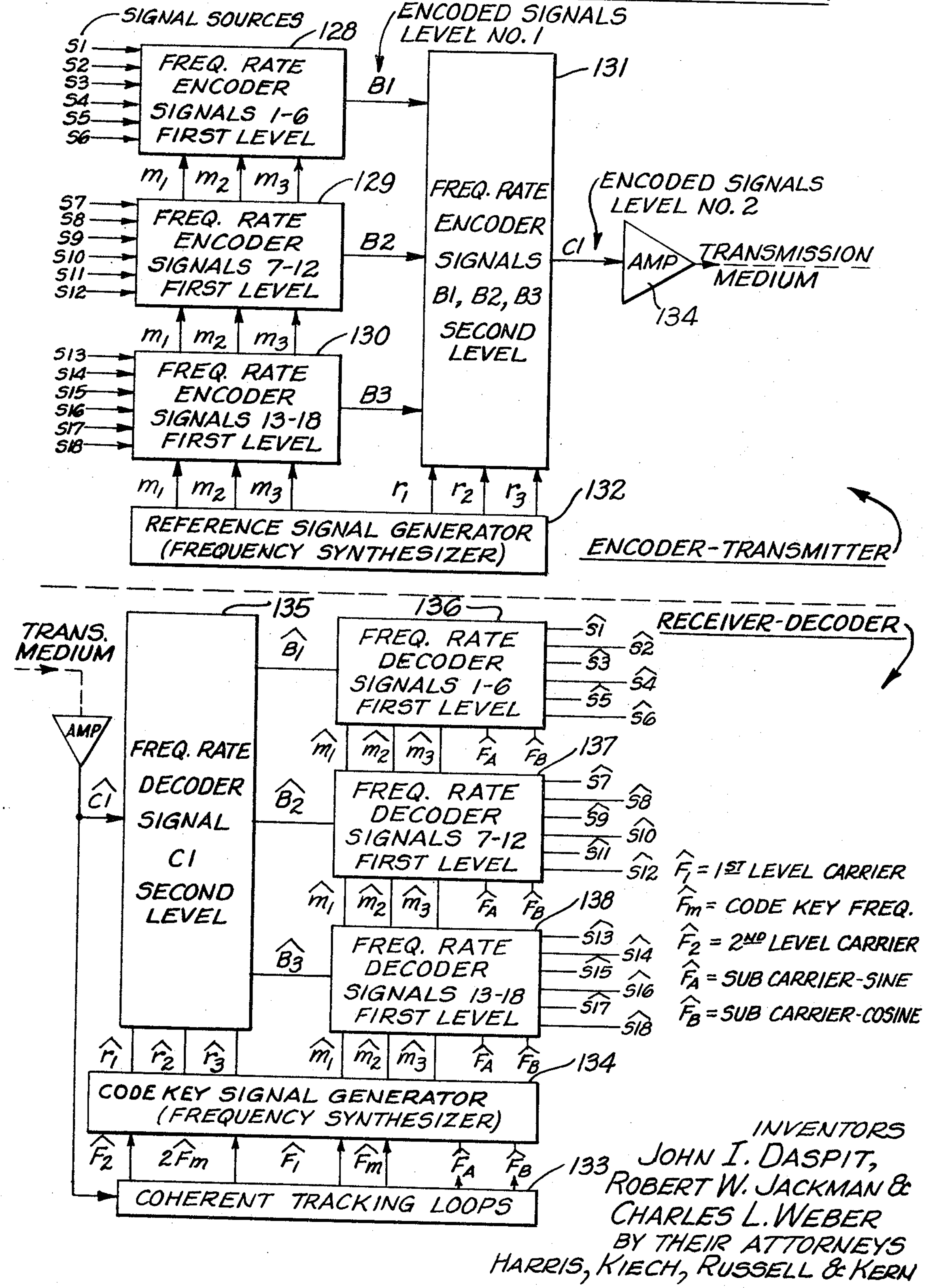
FIG. 6 is a simplified system block diagram of a presently preferred embodiment of the invention using three encoding signals.

An overall system block diagram of the presently preferred embodiment of the frequency-rate communication system is shown in FIG. 6. More detailed block diagrams of the system are shown in FIGS. 7, 8, 9 and 10. The first 128, 129, 130 and second 131 level encoders are similar in function and form to that shown in basic encoder block diagram FIG. 4, which has already been described. The reference signal generator 132 basic function and block diagram was described in connection with FIG. 5A.

Eighteen independent analog and/or digital signals are encoded and bandwidth compressed into a transmission spectral space which is eight times the width of the common spectrum width of any single baseband signal. This yields an encoded transmission bandwidth utilization factor (BUF) of 2.25.

After encoding, conventional amplification at 134 and/or linear modulation and transmission can be carried out (e.g. AM, FM, PM, etc.) to send the encoded signals to the receiver-decoder site(s). At a receiver-decoder site, coherent tracking loops 133 extract the phase reference required for coherent demodulation. The code key generator 134 uses the properly phase-tracked outputs of the coherent tracking loops and generates the code key coherent demodulation reference signals, namely, $\hat{r}_1, \hat{r}_2, \hat{r}_3$ for decoding from second-level to first-level 135 and $\hat{m}_1, \hat{m}_2, \hat{m}_3$ for decoding from first-level to the original signal forms 136, 137, 138, i.e., the recovered and separated signals $\widehat{S1}$ — — — $\widehat{S18}$, where $\widehat{S1}$ — — — $\widehat{S18}$ are decoder estimates of the original signals S1 — — — S18. Detail descriptions of the construction and operation of the encoder-transmitter and receiver-decoder are given in the following sections.

FREQUENCY-RATE ENCODER-TRANSMITTER (FIGS. 7 AND 8)

Figure 7:
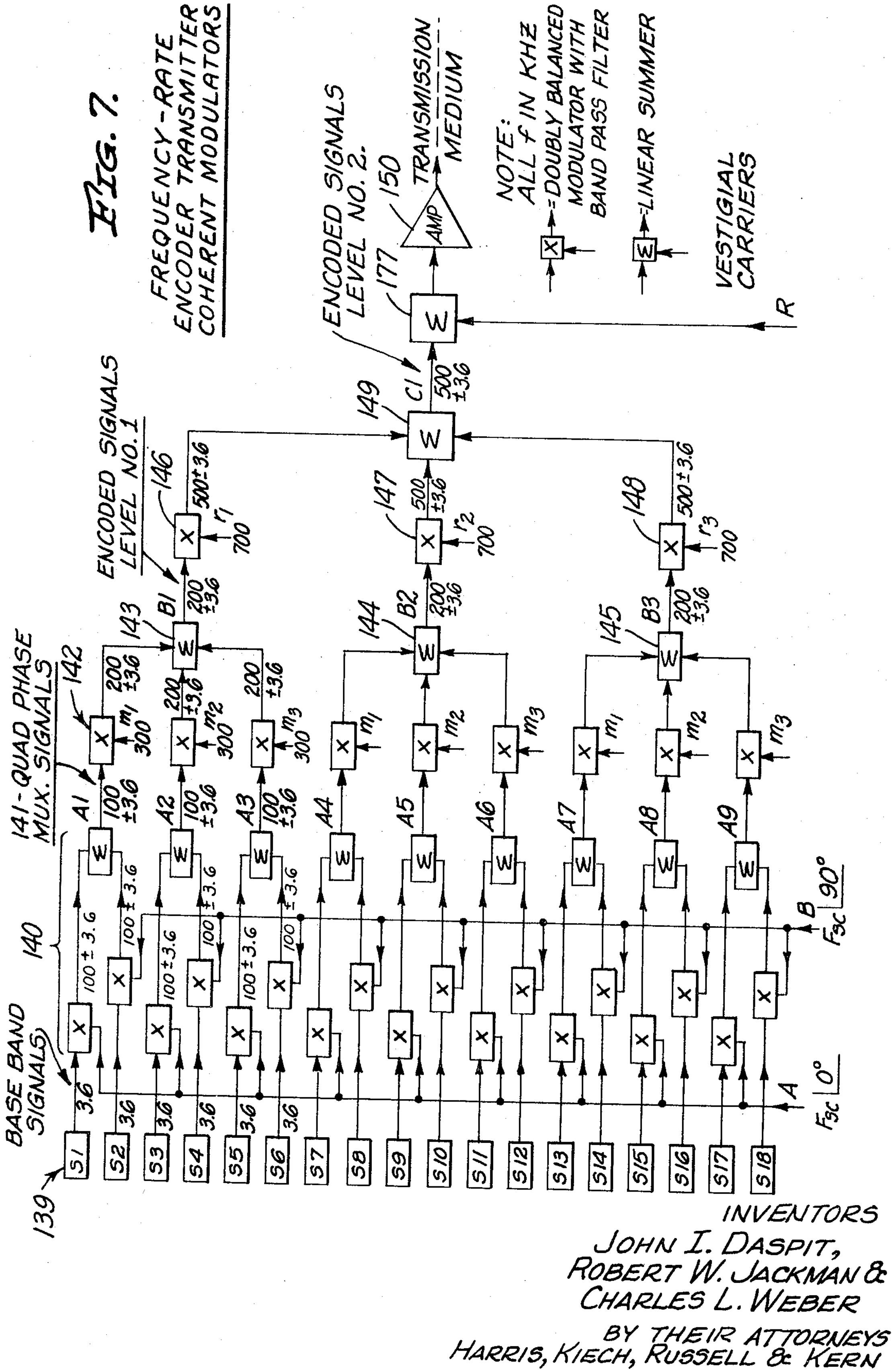
FIG. 7 is a block diagram of an encoder-transmitter (coherent modulators) for the system of FIG. 6.

In FIG. 7, one of the many useful specific embodiments which apply the basic concepts of this invention is detailed. FIG. 7 illustrates, in block diagram form, a frequency-rate encoder-transmitter which accepts 18 baseband analog signals (e.g. voice, teletype, telemetry, etc.) each having a bandwidth less than $F_m$, the code key frequency. As a numerical example, $F_m$ could be selected to be 3.6 kHz. This would make possible frequency-rate encoding and multiplexing of voice signals which have spectral components extending from 300 to 3,000 Hz.

Baseband signal sources 139 are 18 in number and are assumed to be completely independent as to information content. Conventional quadrature phase-multiplex modulation processing is employed with modulators and summers in section 140 to combine the information signals in pairs into the "quadrature phase-multiplexed" signals A1 — — — A9, designated as item 141.

Each of these signals, A1 — — — A9, carries the information of two baseband signals as explained in the preceding section related to the spectral diagrams in FIG. 3A. In particular, A1 is obtained from the modulation processing and linear summation of information signals S1 and S2, according to the spectra shown in 112 and 113. The bandwidth of these conventonal quadrature phase-multiplex signal pairs is 2W where W is the baseband signal bandwidth. Similarly, A2 is obtained by combining S3 and S4, A3 by combining S5 and S6 and so on through A9.

Dual information signals A1, A2 and A3 are each encoded (coherently modulated) by frequency-rate first-level encoders 142 using reference signals $m_1$, $m_2$, and $m_3$, respectively. The generation of first-level reference signals $m_1$, $m_2$, and $m_3$ and second-level reference signals $r_1$, $r_2$, and $r_3$ are described below in connection with FIG. 8.

The bandwidth of each of the three frequency-rate encoded versions of A1, A2 and A3 is 4W. These three signals, occupying exactly the same spectral space, are added in linear summing device 143 to form first-level encoded signal group B1. Similarly, A4, A5 and A6 are encoded by reference signals $m_1$, $m_2$ and $m_3$ respectively and summed in linear adder 144 to form first-level encoded signal group B2. Likewise, dual signals A7, A8 and A9 are encoded by $m_1$, $m_2$ and $m_3$ and summed in 145 to form first-level encoded signal group B3. Each of the first-level encoded signal groups B1, B2 and B3 contain separable information from six independent baseband channels each of bandwidth equal to W. The bandwidth of B1, B2 and B3 is 4W each. Their spectra occupy the same space. Hence, when combined by linear addition, the bandwidth of the sum is 4W also. The bandwidth utilization factor after first-level encoding is: (BUF) = 6 W/4W = 1.5

Each of these three independent first-level encoded signals B1, B2 and B3 are modulated in 146, 147 and 148 by second-level encoding reference signals $r_1$, $r_2$ and $r_3$, respectively, to yield second-level encoded signals of bandwidth 8W each. These second-level encoded signals occupy exactly the same spectral space, one relative to the other, and have exactly the same bandwidth. Hence, when added linearly in summer 149, the combined signal C1 required only the same bandwidth as either of its three additive components. The second-level encoded signal, C1, contains all of the information, in completely separable form, of independent first-level encoded signals, B1, B2 and B3. These second-level encoded signals are contained within a bandwidth 8W. The sum of the baseband spectral widths of the eighteen independent information signals contained in B1, B2 and B3 (of bandwidth W each) is 18W. The bandwidth utilization factor after second-level encoding is, therefore: $(BUF)_2 = 18W/8W = 2.25$ Second-level encoded signal group C1 is amplified at 150 and transmitted by conventional modulation techniques (not necessarily coherent) and using conventional transmission media to the site(s) of the frequency-rate receiver-decoder(s).

FIG. 8 is a detail block diagram of the reference signal generator (frequency synthesizer) which generates the coherent modulation (encoding) reference signals $r_1$, $r_2$, and $r_3$ (for second-level encoding) and $m_1$, $m_2$, and $m_3$ (for first-level encoding). Also generated by this unit of the frequency-rate system are the conventional quadrature phase-multiplex single tone subcarrier modulation references A and B.

For convenience of illustration, numerical values of frequency in kHz have been used in the block diagrams. This does not mean that the frequency-rate system can work only with these particular values. Any set of reference and modulating frequencies which satisfies the basic requirements can be used. The basic frequency limitations are given in the following paragraphs.

Choice of $F_m$: $F_m$, the code key frequency should be equal or greater than the spectral width W of the baseband signal which is to be encoded or it should be at least one-half as large as the spectral width of the double sideband, suppressed carrier spectrum 2W formed by the conventional quadrature phase-multiplex process or (for second-level encoding) it should be at least one-half as large as the symmetrical, double sided spectrum 4W wide, formed by first-level encoding by the frequency rate process.

Choice of $F_{sc}$: $F_{sc}$, the subcarrier employed for the conventional quadrature phase-multiplex part of this process should be at least as great as the baseband signal spectral width, W. Conventional practice usually dictates a value of $F_{sc}$ at least as large as 10W. Since the subcarrier must be coherently recovered at the receiver, the subcarrier must be coherently related to the vestigal carrier reference ($F_1$ and $F_2$) which are transmitted with the composite encoded signal.

Choice of $F_{r1}$ and $F_{r2}$: These are the center frequencies of the encoding triplet signals for first-level ($F_{r1}$) and second-level ($F_{r2}$) encoding. The relation between $F_1$, $F_{r1}$ and $F_{sc}$ is $F_{r1} \pm F_{sc} = F_1$ with choice of sum or difference modulation product being at the designer's discretion and based on the usual practical considerations of coherent signal generation such as avoidance of spectral overlap, available components and, in general, all state-of-the-art design techniques, practices, devices and limitations.

Transmission center frequency. This is shown in the specific embodiment of this technique, selected for explanatory purposes as $F_2$. It should be understood that, once the frequency-rate multiplexed spectrum has been formed about $F_2$ as a center frequency and vestigial carrier, the encoded and multiplexed signals can be transmitted via any conventional modulation methods, such as AM, FM, PM, etc. If desired, and without losing any of the basic encoded and multiplexed features of this frequency-rate process, the encoded and multiplexed signals may be transmitted at $F_2$ by linear amplification and sending through the selected transmission medium.

With the foregoing in mind and for exemplary illustration only, the following mutually consistent choices of frequencies and/or spectral band limits have been made:

$W = 3.6$ kHz
$F_{sc} = 100$ kHz
$F_{r1} = 300$ kHz
$F_1 = 200$ kHz
$F_{r2} = 700$ kHz
$F_2 = 500$ kHz

In FIG. 8, signal generator 151 produces the conventional quadrature phase-multiplex reference signal B at 100 kHz. Phase shifter 152 produces reference signal A which is equal in frequency and in quadrature with B. These two 100 kHz reference signals, A and B are used together with the conventional section 140 to form conventional dual-quadrature signals A1, A2 — — — A9.

A frequency multiplier 153 produces a 300 kHz spectral line which serves as a common input to balanced modulators 154, 155, 156. A phase shifter 157 produces a quadrature version of the output of multiplier 153 which serves as a common input to the linear adders 158, 159, 160.

A signal generator 161, the code key frequency signal generator, produces a sinusoidal output of frequency $F_m$, chosen to be 3.6 kHz for specific illustrative purposes. The output of this code key frequency signal generator together with phase shifters 162 and 163 provides unique encoding modulation to the balanced amplitude modulators 154, 155 and 156. The outputs of these modulators (difference component only) each consist of uniquely different sideband pairs at 300 ± 3.6 kHz. Quadrature center frequency components are added to the sideband pairs in linear adders 158, 159, 160 to form the first-level encoding reference signals $m_1$, $m_2$ and $m_3$. Each of these encoding signals is made up of three spectrum lines at frequencies 300, 300 + 3.6 and 300 − 3.6 kHz. These first-level encoding reference signals, $m_1$, $m_2$ and $m_3$ are used to amplitude modulate A1, A2, A3 — — — A9 at 140 (FIG. 7).

The 100 kHz signal developed by phase shifter 152 is frequency multiplied by a factor of 2.0 in multiplier 164 whose output is used as one input to doubly balanced modulator 165. The output of signal generator 161 is used as the other input to modulator 165. The output of modulator 165 is a pair of AM spectral lines at 200 ± 3.6 kHz.

The output of phase shifter 152, a 100 kHz spectral line, is frequency multiplied by seven in multiplier 166 and used to amplitude modulate the output of modulator 165 in modulator 167. The difference frequency modulation product only is retained so that the yield from modulator 167 are two spectral lines at 500 ± 3.6 kHz. These two spectral lines form part of the phase-reference vestigial carrier group which is transmitted along with the intelligence.

The output of frequency multiplier 166 provides one common input to modulators 168. Phase shifter 169 produces a spectral line in quadrature to the output of multiplier 166, i.e., at frequency 700 kHz. This quadrature 700 kHz line serves as a common input to linear adders 170.

Frequency multiplier 171 multiplies the output of generator 161 by two. This frequency, 7.2 kHz, becomes the code key frequency for second-level encoding. The output of multiplier 171, together with code key phase shifters **172*a* and 173*a* form code key inputs to balanced modulators 168. The outputs of modulators 168 are amplitude modulation spectral lines at 700 ± 7.2 kHz. These form one set of inputs to linear adders 170, the outputs of which are each three spectral line (encoding triplet) reference signals with the frequencies being 700, 700 ± 7.2, and 700 − 7.2 (all in kHz). $r_1$, $r_2$ and $r_3$ are used as inputs to encoder-modulators 146, 147, 148 (FIG. 7) to accomplish a second-level encoding of B1, B2 and B3 respectively. The outputs of modulators 146, 147, 148 are summed linearly at 149** to yield C1, the composite, second-level frequency-rate encoded and multiplexed signal group.

Figure 11:
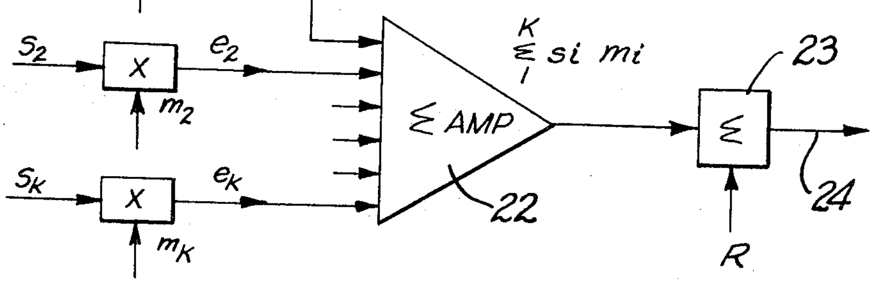
FIG. 11 is a block diagram of a transmitter of an alternative embodiment of the invention using a plurality of encoding signals.
Figure 13:
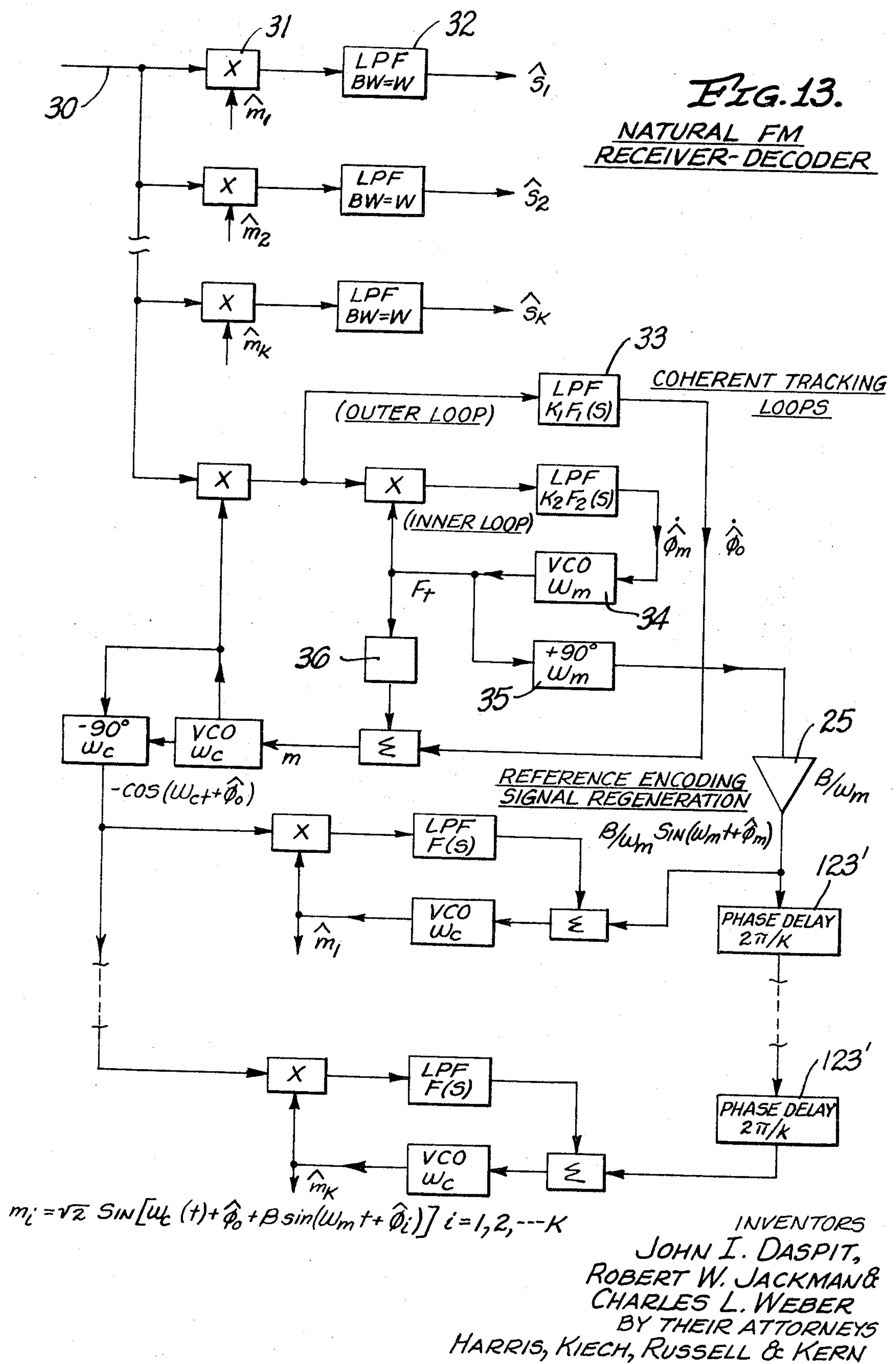

FIG. 13 is a block diagram of a receiver for use with the transmitter of FIG. 11.

GLOSSARY OF SYMBOLS and references.

FREQUENCY-RATE RECEIVER-DECODER (FIGS. 9 AND 10)

Figure 9:
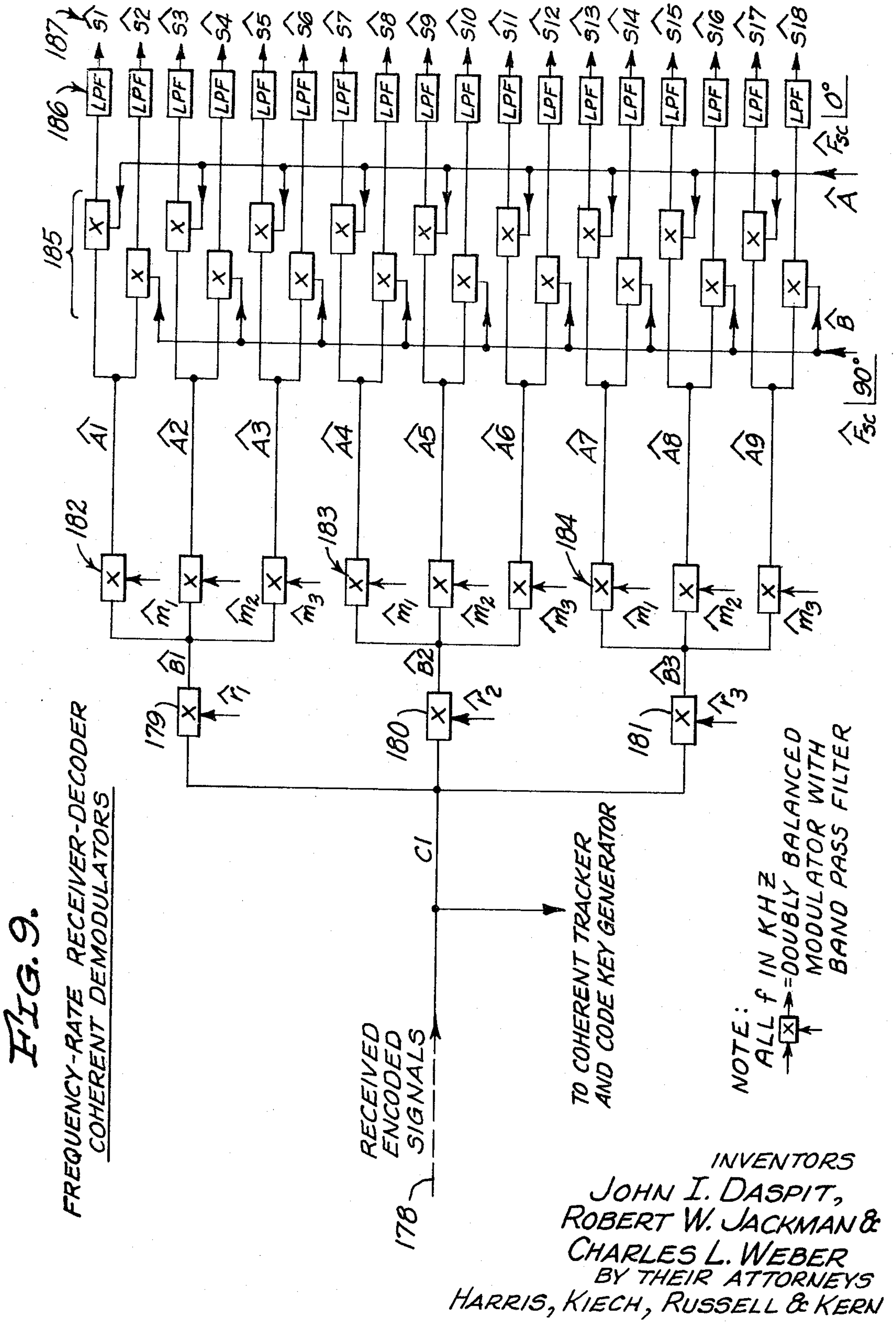
FIG. 9 is a block diagram of a receiver-decoder (coherent demodulators) for the system of FIG. 6.

FIG. 9 is a detail block diagram of a two-level (single iteration) eighteen channel frequency-rate receiver-decoder. Received second-level frequency-rate encoded signals, C1, complete with phase reference (vestigial carrier) spectral lines are connected to second-level decoding demodulators 179, 180, 181 and to the coherent tracking system which is detailed in FIG. 10.

Figure 10:
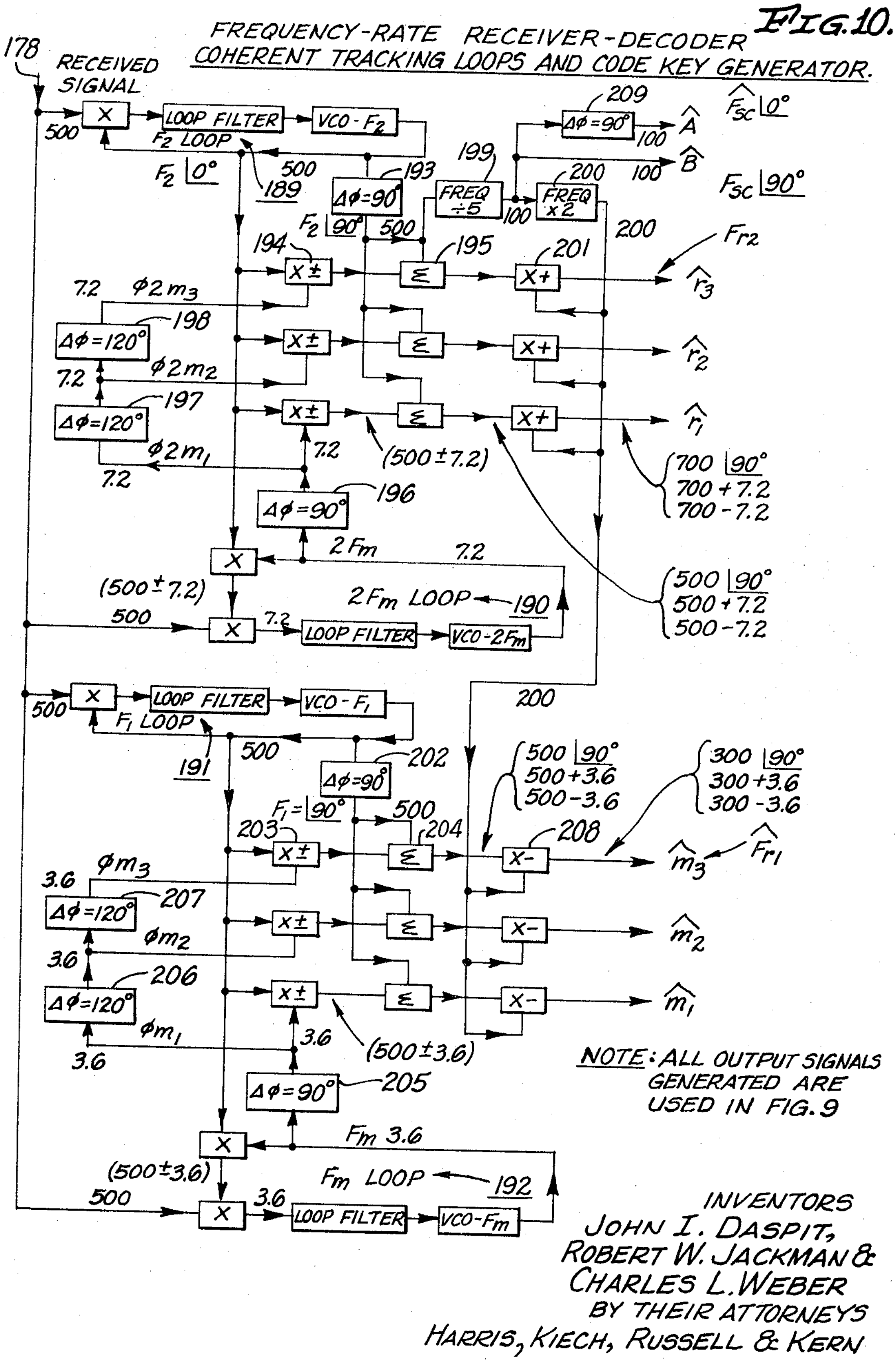
FIG. 10 is a block diagram of a receiver-decoder (coherent tracking loops and code key generator) for the system of FIG. 6.

The coherent tracking system plus prior known code key information from FIG. 10 generates code key demodulation reference signals $\widehat{r_1}, \widehat{r_2}, \widehat{r_3}$ which are inputs, respectively, to coherent demodulators 179, 180, 181. The outputs of these demodulators are first-level frequency-rate encoded signals, center frequency at (e.g.) 200 kHz. These signals, $\widehat{B1}, \widehat{B2}$ and $\widehat{B3}$ are each applied to separate groups of three identical demodulators 182, 183, 184.

Coherent demodulation reference signals $\widehat{m_1}, \widehat{m_2}$, and $\widehat{m_3}$, generated in the coherent tracker and code key generator (FIG. 10), are employed as demodulation (decoding) references to demodulators 182, 183, 184. Demodulators 12 convert signal B1 from the first-level encoded form to the general form of A1, A2 and A3 shown spectrally in 113 of FIG. 3A. The center frequency of each is $F_{sc}$, the quadrature phase-multiplex subcarrier. These signals are labelled $\widehat{A1}, \widehat{A2}$ and $\widehat{A3}$ to indicate that they are the receiver-decoder estimates of the original signals A1, A2, A3 at the corresponding level of the encoding-transmitter. Similarly, the group $\widehat{A4}, \widehat{A5}$ and $\widehat{A6}$ and the group $\widehat{A7}, \widehat{A8}$ and $\widehat{A9}$ are derived with the same three demodulation reference signals, $\widehat{m_1}, \widehat{m_2}$ and $\widehat{m_3}$ in demodulator groups 183 and 184.

In conventional quadrature phase-multiplex demodulators 185 and low-pass-filters 186, decoded signal estimates $\widehat{A1}, \widehat{A2}$ — — — $\widehat{A9}$ are each separated into the related pairs of estimated baseband signals by means of conventional quadrature phase-multiplex reference signals $\hat{B}$ and $\hat{A}$, generated in the coherent tracker and code key generator. $\widehat{A1}$ is separated (conventionally) into $\widehat{S1}$ and $\widehat{S2}$, $\widehat{A2}$ is separated into $\widehat{S3}$ and $\widehat{S4}$, and so on until all eighteen of the decoder estimates of the original signals have been recovered in separated form.

Since the 18 separate independent input signals S1-S18 (FIG. 7) are once again separated completely, one from the other, (the output signals 187 of FIG. 9), the receiver may elect to use any one of the eighteen signals originally fed into the frequency-rate coder transmitter, as by selectively opening connections at various points in the circuit of FIG. 9. Hence, the overall frequency-rate communication system as described possesses multiple-signal selective-address capabilities. This is so since one receiver-decoder could generate only $\widehat{r_1}$ and $\widehat{m_1}$ and $\hat{A}$ and thus select $\widehat{S1}$. Another receiver-decoder could generate $\widehat{r_1}, \widehat{m_1}$ and $\hat{B}$ and thus select $\widehat{S2}$, and a third receiver-decoder could generate $\widehat{r_1}$, $\widehat{m_2}$ and $\hat{A}$ and select $\widehat{S3}$, etc. Any one receiver-decoder can, provided the code key is known, after coherent tracking has been established, select which signal or signals will be decoded to the exclusion of the unwanted signal or signals.

FIG. 10 is a detail block diagram of the coherent tracking loop 133 and code key generator 134 of FIG. 6. The received signal at 178 of FIG. 9, is applied to the second and first-level coherent tracking loops. The second-level loops are the $F_2$ loop 189 and the $2F_m$ loop 190. The first-level tracking loops are the $F_1$ loop 191 and the $F_m$ loop 192. These loops are conventional, state-of-the-art phase lock loops.

The output of loop 189 is $F_2 \angle 0°$, the vestigial center frequency phase reference signal which is transmitted as a part of the composite encoded signal on 178. $F_2 \angle 0°$ is phase shifted by 90° in shifter 193 to produce $F_2 \angle 90°$, $F_2 \angle 0°$ is used as a common input to balanced modulators 194, $F_2 \angle 90°$ is supplied as the common input to linear adders 195. Loop 190 recovers the second-level code key frequency $2F_m$. Phase shifter 196 inserts a quadrature shift in the code key frequency. The code key phase shifters 197 and 198 produce 129° phase shift each. Thus the code key inputs to modulators 194 are 120° relative to each other, with the outputs being amplitude modulation sideband pairs centered about $F_2$. These are added in summers 195 to produce three sets of signals which are receiver estimates of the second-level encoding triplet signals, except that they are centered about $F_2$ instead of being centered about $F_{r2}$.

Frequency divider 199 divides $F_2 \angle 90°$ by five to produce the subcarrier $F_{sc}$ (e.g. at 100 kHz). Frequency multiplier 200 multiplies $F_{sc}$ by two to produce a common input for balanced modulators 201 which produce the sum frequency of their inputs, namely, 700 kHz. An encoding triplet estimation for each of the second-level encoding signals is then available from modulators 201. This is used in the receiver-decoder coherent demodulators (FIG. 9) as signals marked $\widehat{r_1}, \widehat{r_2}$ and $\widehat{r_3}$. In a similar manner, the first-level demodulation reference signals $\widehat{m_1}, \widehat{m_2}$ and $\widehat{m_3}$ are generated from the output of tracking loops 191 and 192, the code key phase shifters 206 and 207, modulators 203, linear adders 204 and modulators 208, and phase shifters 202, 205.

The output of frequency divider 199 is at the subcarrier frequency (e.g. 100 kHz). The in-phase signal output forms $\hat{B}$, the tracking loop estimate of the subcarrier signal, B, used in the encoding process. Phase shifter 199 produces the quadrature subcarrier $\hat{A}$. These two signals are used to provide demodulation references to conventional quadrature phase-multiplex demodulators 195 of FIG. 9.

DESCRIPTION OF AN ALTERNATIVE EMBODIMENT (FIGS. 11–13)

Figure 12:
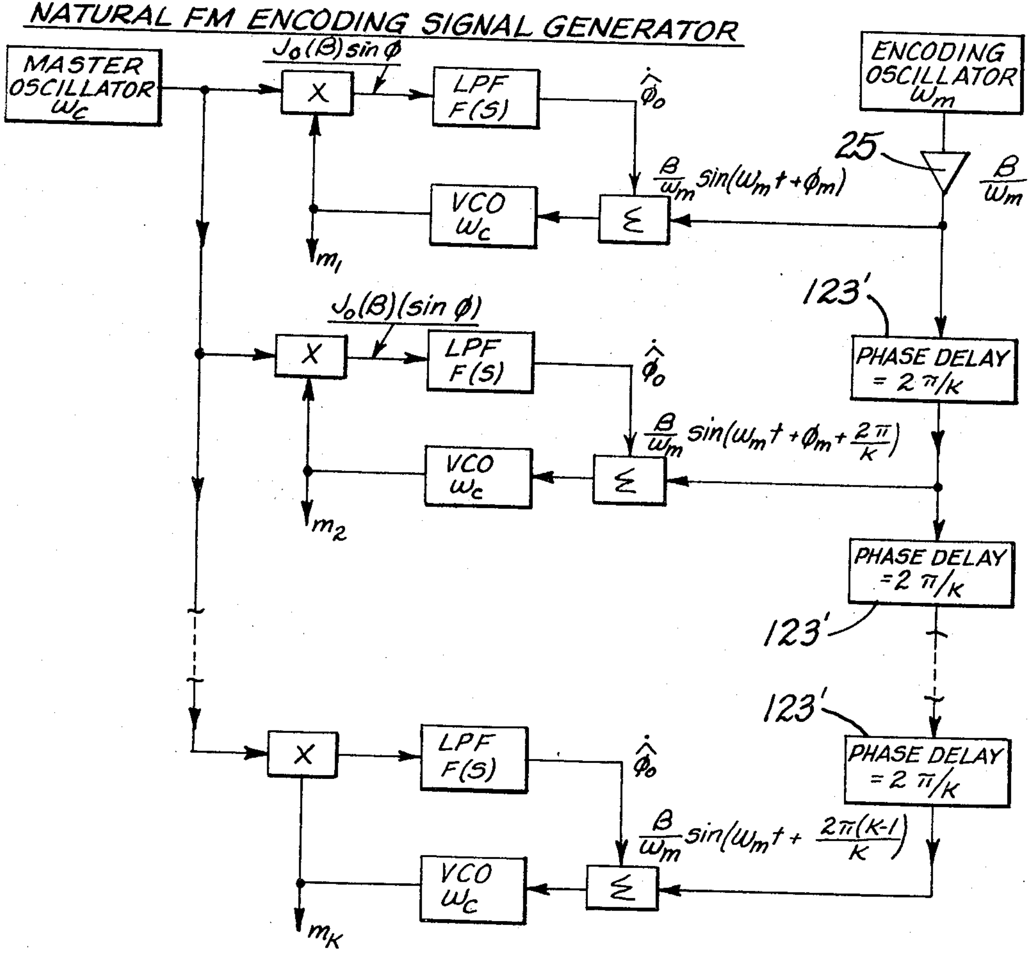
FIG. 12 is a block diagram of apparatus for generation of the encoding signals for use in the transmitter of FIG. 11; and FIG. - I A BLOCK DIAGRAM OF A RECEIVER FOR USE WITH THE TR-NSMITTER OF FIG. 11.

An alternative embodiment of the frequency rate communication system utilizing a plurality K encoding signals, where K may be greater than 3, is illustrated in FIGS. 11–13. An information signal $S_1$ and an encoding signal $m_1$ are combined at a modulator 21 to provide an encoded signal $e_1$. A plurality of such encoded signals $e_1 - e_k$ are combined at a summing amplifier 22. The vestigial carriers R are introduced at a linear summer 23 to provide the output signal for transmission on line 24. While FIG. 11 illustrates the use of baseband information signals $S_1 - S_k$, the input signal handling capacity can be doubled by utilizing the quadrature phase-multiplexing with pairs of base-band signals combined to provide input signals $A_1 - A_k$ for the modulators in the embodiment of FIG. 11, in the same manner as in the embodiment of FIG. 7.

The embodiment of FIGS. 11–13 provides a higher order of spectrum spreading than the previously described embodiment. Iteration is not utilized in the FIGS. 11-13 embodiment because there is enough band spread and input signal handling capability without requiring the additional processing steps. The multisignal configuration with K greater than 3 permits arbitrarily good separation of one signal from all the others with the FM index of the encoding reference made higher. Increasing the FM index $\beta$ increases the bandwidth of the encoded signal.

For example, in the situation where $F_m = W$, with eight simultaneously transmitted signals ($K = 8$) there is a value of the frequency modulation index of $\beta = 15.0$ for which the total distortion drops to $-17$ db, a very useable residual distortion level. The bandwidth associated with this value of $\beta$ is $W_{IF} = 2\ (\Delta F) + 2W$. Since $\beta = (\Delta F/F_m)$ and since $F_m = W$, we have $\Delta F = \beta \cdot F_m = \beta \cdot W$, so that $W_{IF} = 2\ (\beta \cdot W) + 2W = 2W\ (1 + \beta)$. For the case being considered $\beta = 15.0$, thus $W_{IF} = 2W\ (1 + 15.0) = 32W$. $W = 4.0$ kHz for one voice channel, so that the transmission bandwidth is 128 kHz.

For a group of twelve voice channels occupying 48 kHz overall, the expanded bandwidth, for $K = 8$, $\beta = 15.0$ and $F_m = W = 48$ kHz, would be 1.53 MHz. For a group of 144 voice channels occupying 576 kHz overall, the expanded bandwidth for $K = 8$, $\beta = 15.0$ and $F_m = W = 576$ kHz would be 18.4 MHz. These wide bandwidths are realized without iteration, which means less equipment and lower implementation cost. If better performance than $-17$ db crosstalk is needed, $\beta$ can be increased to the related value and the bandwidth will be still further expanded.

This embodiment is suited for mobile communications as an anti-multipath technique because of the capability of obtaining very large bandwidths without iteration. It should be noted, however, that the high bandwidth utilization factor feature of the previously described embodiment must be traded for the easy-to-come-by bandwidth expansion of the present embodiment.

A circuit for generating the K encoding signals $m_1 - m_k$ is shown in FIG. 12. The FIG. 12 circuitry corresponds to that of FIG. 5B but has K sections rather than 3 sections. The phase delay introduced at each phase shifting unit 123' will be 360/K°, rather than the 120° of the FIG. 5B circuit. The amount of spectral spreading and the overall signal bandwidth is controlled by the gain of the amplifier 25, with a gain of $\beta / \omega_m$.

Coherent tracking and signal demodulation are provided in the receiver-decoder of FIG. 13, with the received encoded signals arriving on line 30. The incoming encoded signals are connected as inputs to each of the demodulators 31, with each demodulator having one of the decoding signals $\hat{m}_1 - \hat{m}_k$ as the other input, providing an output to the low pass filter 32, to provide the demodulated estimate $\hat{S}_1$ of the original information signal $S_1$.

The coherent tracking loops and the decoding signal generator of the receiver of FIG. 13 are similar to that previously described, with the amplifier 25 similar to the amplifier 25 of FIG. 12. The components shown in the blocks are conventional, including low pass filters as at 33, voltage controlled oscillators as at 34, phase shifters as at 35, and an attenuator 36.

Although exemplary embodiments of the invention have been disclosed and discussed, it will be understood that other applications of the frequency rate communication system of the invention are possible and that the embodiments disclosed may be subjected to various changes, modifications and substitutions without necessarily departing from the spirit of the invention.

We claim:

1. In a communication system, the combination of:

first means for generating a plurality of frequency-rate signals each comprising a frequency modulated carrier, for use as encoding signals and having equal frequency and equal phase carriers and varying in frequency with time at the same frequency modulation, with the frequency modulations of said encoding signals differing in phase from each other with substantially equal phase differences, said first means for generating including a first oscillator for generating a first output signal at a first frequency, phase shifter means having said first output signal as an input for producing additional output signals at said first frequency and at predetermined phase relations with said first output signal, a second oscillator for generating a carrier signal, and means having said output signals and said carrier signal as inputs for producing said plurality of frequency-rate signals as outputs by frequency modulating said carrier signal with each of said output signals;

first modulation means for amplitude modulating an encoding signal with a modulating signal to produce a frequency-rate modulated encoded signal, said modulating signal including a base band information signal;

means for connecting an encoding signal and a modulating signal to said first modulation means as inputs;

first summing means having one or more encoded signals as inputs and providing an output which is the sum of the inputs thereto; and circuit means for transmitting said first summing means output to a receiver.

2. A system as defined in claim 1 including second means for generating a modulating signal in the form of a double side band, suppressed carrier signal.

3. A system as defined in claim 2 wherein said second generating means includes means for combining two base band information signals, digital or analog in nature and of single sided spectra, to produce a quadrature phase multiplex amplitude modulation, double side band, suppressed carrier signal as the modulating signal.

4. A system as defined in claim 3 wherein said second generating means includes means for generating three of said modulating signals, and said modulation means includes three modulators each having a modulating signal and a different encoding signal as inputs, with the summing means output incorporating up to six information signals.

5. A system as defined in claim 2 wherein said second means for generating includes means for generating three of said modulating signals, and said modulation means includes three modulators each having a modulating signal and a different encoding signal as inputs, and said system including:

third and fourth means for generating a modulating signal and each corresponding to said second means for generating;

second and third modulation means for amplitude modulating an encoding signal and each corresponding to said first modulation means;

second and third summing means each corresponding to said first summing means;

fifth means for generating three frequency-rate signals for use as additional encoding signals and having equal frequency and equal phase carriers and varying in frequency with time at the same frequency modulation, with the frequency modulations of said additional encoding signals differing in phase from each other with substantially equal phase differences;

fourth modulation means for amplitude modulating an additional encoding signal with a summing means output signal to produce an additional frequency-rate modulated encoded signal, said fourth modulation means including three modulators each having a summing means output signal and a different additional encoding signal as inputs; and fourth summing means having one or more additional encoded signals as inputs and producing an output which is the sum of the inputs thereto for transmitting to a receiver.

6. A system as defined in claim 1 wherein said modulating signal is a base band information signal.

7. A system as defined in claim 1 wherein said first generating means also generates a vestigial level reference signal, and including an additional summing means having said first summing means output and said vestigial level reference signal as inputs to provide a summed output for transmission to a receiver.

8. A system as defined in claim 1 wherein said first generating means includes means for generating each of the frequency-rate encoding signals in the form of three substantially equal amplitude spectral lines differing in frequency by the frequency modulation rate, with the central line having a phase which is 90° from the vector sum of the outer lines.

9. A system as defined in claim 1 wherein said first generating means includes means for generating each of the frequency-rate encoding signals in the form of a sinusoidally frequency modulated signal providing a narrow band FM spectra.

10. A system as defined in claim 1 wherein said first generating means for generating three encoding signals, with the frequency modulations thereof differing in phase by substantially 120°.

11. A system as defined in claim 1 wherein said first generating means includes means for generating $n$ encoding signals, with the frequency modulations thereof differing in phase by substantially $360/n°$.

12. A system as defined in claim 1 wherein the modulating frequency of said encoding signals is equal to or greater than the band width of the information signals being transmitted.

13. A system as defined in claim 12 wherein the frequency modulation index of said encoding signals is of the order of 1.39.

14. In a communication system for operation with a frequency-rate amplitude modulated encoded input signal, the combination of:

first means for generating a plurality of frequency-rate signals each comprising a frequency modulated carrier, for use as decoding signals and having equal frequency and equal phase carriers and varying in frequency with time at the same frequency modulation, with the frequency modulations of said decoding signals differing in phase from each other with substantially equal phase differences, said first means for generating including a first oscillator for generating a first output signal at a first frequency, phase shifter means having said first output signals at said first frequency and at predetermined phase relations with said first output signal, a second oscillator for generating a carrier signal, and means having said output signals and said carrier signal as inputs for producing said plurality of frequency-rate signals as outputs by frequency modulating said carrier signal with each of said output signals;

first modulation means for amplitude demodulating an input signal with a decoding signal to produce a demodulated signal; and means for connecting a decoding signal and an encoded input signal to said first modulation means as inputs.

15. A system as defined in claim 14 wherein said first modulation means includes three demodulators each having an encoded input signal and a different decoding signal as inputs for providing three separate demodulated signals.

16. A system as defined in claim 15 including:

second means for generating two additional demodulating signals of the same frequency and in phase quadrature with each other; and second modulation means having three pairs of first and second additional demodulators, each pair having a demodulated signal as one input and the demodulators of a pair having respectively the first and second additional demodulating signals as inputs, for providing up to six information signals as outputs.

17. A system as defined in claim 14 including:

second means for generating two additional demodulating signals of the same frequency and in phase quadrature with each other; and second modulation means having first and second additional demodulators, each having a demodulated signal and an additional demodulating signal as inputs for providing an information signal as an output.

18. A system as defined in claim 14 wherein said first generating means includes means for generating each of the frequency-rate decoding signals in the form of three substantially equal amplitude spectral lines differing in frequency by the frequency modulation rate, with the central line having a phase which is 90 degrees from the vector sum of the outer lines.

19. A system as defined in claim 14 wherein said first generating means includes means for generating each of the frequency-rate decoding signals in the form of a sinusoidally frequency modulated signal providing a narrow band FM spectra.

20. A system as defined in claim 14 wherein said first generating means includes means for generating three decoding signals, with the frequency modulations thereof differing in phase by substantially 120°.

21. A system as defined in claim 14 wherein said first generating means includes means for generating $n$ decoding signals, with the frequency modulations thereof differing in phase by substantially $360/n°$.

22. In a communication system, the combination of:

first means for generating a plurality of frequency-rate signals each comprising a frequency modulated carrier, for use as encoding signals and having equal frequency and equal phase carriers and varying in frequency with time at the same frequency modulation, with the frequency modulations of said encoding signals differing in phase from each other with substantially equal phase differences, said first means for generating including a first oscillator for generating a first output signal at a first frequency, phase shifter means having said first output signal as an input for producing additional output signals at said first frequency and at predetermined phase relations with said first output signal, a second oscillator for generating a carrier signal, and means having said output signals and said carrier signal as inputs for producing said plurality of frequency-rate signals as outputs by frequency modulating said carrier signal with each of said output signals;

first modulation means for amplitude modulating an encoding signal with a modulating signal to produce a frequency-rate modulated encoded signal, said modulating signal including a base band information signal;

means for connecting an encoding signal and a modulating signal to said first modulation means as inputs;

first summing means having one or more encoded signals as inputs and providing an output which is the sum of the inputs thereto;

circuit means for transmitting said first summing means output to a receiver;

second means for generating a plurality of frequency-rate signals for use as decoding signals and having equal frequency and equal phase carriers and varying in frequency with time at the same frequency modulation, with the frequency modulations of said decoding signals differing in phase from each other with substantially equal phase differences;

second modulation means for amplitude demodulating an input signal with a decoding signal to produce a demodulated signal; and means for connecting a decoding signal and the output of said first summing means to said modulation means as inputs.

23. In a process for transmitting a plurality of information signals, the steps of:

a. generating a plurality of first encoding signals having equal frequency and phase carriers and the same frequency modulation, with the frequency modulations of the encoding signals differing in phase with substantially equal phase differences;

b. amplitude modulating at least one of the first encoding signals with input modulating signals, producing modulated signals;

c. combining the modulated signals by linear summing to produce a combined signal;

b. transmitting the combined signal to a receiver;

e. generating a plurality of frequency modulated first decoding signals of the same frequency and phase carriers and the frequency modulation as the first encoding signals; and f. demodulating the combined signal at the receiver with at least one of the first decoding signals for reproducing an input modulating signal.

24. The process of claim 23 including the additional steps of:

g. performing steps (a) and (b) with three encoding signals and three input modulating signals;

h. repeating steps (b) and (c) for three additional input modulating signals;

i. repeating steps (b) and (c) again for three additional input modulating signals;

j. generating three second encoding signals having equal frequency and phase carriers and the same frequency modulation, with the frequency modulations of the second encoding signals differing in phase with substantially equal phase differences;

k. amplitude modulating the three second encoding signals with the three combined signals respectively, producing three second modulated signals;

l. combining the three second modulated signals by linear summing to produce a further combined signal for transmission to the receiver;

m. generating three frequency modulated second decoding signals of the same frequency and phase carriers and the same frequency modulation as the second encoding signals;

n. demodulating the further combined signal at the receiver with each of the three second decoding signals reproducing the combined signals; and o. repeating steps (e) and (f) for each of the reproduced combined signals.

25. A process as defined in claim 24 including the steps of:

p. converting pairs of single sided spectra information signasl to amplitude modulation, double sideband, suppressed carrier signals, for use as input modulating signals; and q. demodulating the reproduced input modulating signals at the receiver with quadrature phased demodulating signals to reproduce the information signals.

26. A process as defined in claim 25 including the step of (r) at the receiver selecting one of the first decoding signals and one of the second decoding signals and one of the quadrature phased demodulating signals to determine the specific information signal reproduced at the receiver.

27. A process as defined in claim 24 including the step of (s) at the receiver selecting one of the first decoding signals and one of the second decoding signals to determine the specific modulating input signal reproduced at the receiver.

28. A process as defined in claim 23 including the steps of:

p. converting pairs of single sided spectra information signals to amplitude modulation, double sideband, suppressed carrier signals, for use as input modulating signals; and q. demodulating the reproduced input modulating signals at the receiver with quadrature phased demodulating signals to reproduce the information signals.

29. A process as defined in claim 23 including the step of (t) at the receiver selecting one of the first decoding signals to determine the specific modulating input signal reproduced at the receiver.

* * * * *